US009144950B2

(12) United States Patent
Roessler

(10) Patent No.: US 9,144,950 B2
(45) Date of Patent: Sep. 29, 2015

(54) PRESS TO BRIQUET GRANULAR MATERIAL

(71) Applicant: WEIMA MASCHINENBAU GmbH, Ilsfeld (DE)

(72) Inventor: Peter Roessler, Baden Baden (DE)

(73) Assignee: WEIMA MASCHINENBAU GMBH, Ilsfeld (DE)

( * ) Notice: Subject to any disclaimer, the term of this patent is extended or adjusted under 35 U.S.C. 154(b) by 0 days.

(21) Appl. No.: 13/873,759

(22) Filed: Apr. 30, 2013

(65) Prior Publication Data

US 2013/0309347 A1 Nov. 21, 2013

(30) Foreign Application Priority Data

Apr. 30, 2012 (DE) ......................... 10 2012 008 429
Sep. 6, 2012 (DE) ......................... 10 2012 017 573

(51) Int. Cl.

| | |
|---|---|
| *B29C 43/36* | (2006.01) |
| *B30B 11/02* | (2006.01) |
| *B30B 7/04* | (2006.01) |
| *B30B 11/00* | (2006.01) |
| *B30B 11/04* | (2006.01) |
| *B30B 15/32* | (2006.01) |

(52) U.S. Cl.
CPC . *B30B 11/02* (2013.01); *B30B 7/04* (2013.01); *B30B 11/007* (2013.01); *B30B 11/04* (2013.01); *B30B 15/32* (2013.01)

(58) Field of Classification Search
USPC .................. 425/256, 257, 346, 352, 412, 457
See application file for complete search history.

(56) References Cited

U.S. PATENT DOCUMENTS

| | | | | |
|---|---|---|---|---|
| 3,005,403 | A * | 10/1961 | Van Endert | 100/98 R |
| 4,541,332 | A * | 9/1985 | Horansky et al. | 100/3 |
| 4,787,308 | A * | 11/1988 | Newsom et al. | 100/50 |
| 5,307,739 | A * | 5/1994 | Gourdol | 100/98 R |
| 5,587,187 | A * | 12/1996 | Benade | 425/412 |
| 5,983,788 | A * | 11/1999 | Wernimont | 100/125 |
| 7,377,214 | B2 * | 5/2008 | Schomisch et al. | 100/35 |

* cited by examiner

*Primary Examiner* — Joseph S Del Sole
*Assistant Examiner* — Thukhanh T Nguyen
(74) *Attorney, Agent, or Firm* — Factor Intellectual Property Law Group, Ltd.

(57) ABSTRACT

In a briquetting press, the delivery end of a compressing cylinder is closed by a swivellable cylinder bottom which can be displaced between a working position which is in alignment with the axis of the compressing cylinder and an unblocking position which unblocks the end of the compressing cylinder.

15 Claims, 5 Drawing Sheets

PRESS TO BRIQUET GRANULAR MATERIAL

RELATED APPLICATIONS

This application claims the filing benefit of: German Patent Application No. 10 2012 008 429.3 filed on Apr. 30, 2012; and, German Patent Application No. 10 2012 017 573.6 filed on Sep. 6, 2012.

FIELD OF THE INVENTION

The invention relates to a press for briquetting granular material.

BACKGROUND OF THE INVENTION

Presses of this kind are obtainable on the market. They serve primarily for compressing waste in the form of chips, such as is produced during the machining of wood and plastics by cutting, or materials similar to granulate or powder, to form compact briquettes which can be easily handled and can be stored in a space-saving manner.

Such a press is described, for example, in DE 10 2010 012 300A1.

In the case of this press, the relative movement between the cylinder bottom and the compressing cylinder takes place as a result of the fact that a drum, which comprises a plurality of compressing cylinders distributed in the peripheral direction, is turned over above a stationary plate which, at the same time, constitutes the cylinder bottoms for the various compressing cylinders.

This arrangement takes up a relatively large amount of space. A lot of material has to be used for producing it, and the press is correspondingly heavy.

The intention is to provide, by means of the present invention, a briquetting press of the kind initially provided, which takes up less space and can be produced using less material.

SUMMARY OF THE INVENTION

This object may be achieved, according to the invention, by means of a press having the features described herein.

In the briquetting press according to the invention, the cylinder bottom needs to have only a slightly larger transverse dimension than the clear diameter of the compressing cylinder. The cylinder bottom is therefore a compact and light component. Because of its relatively low weight, it can be quickly moved between a working position, in which it closes that side of the compressing cylinder which is remote from the compressing piston, into an ejecting position, in which that end of the compressing cylinder which is remote from said compressing piston is open.

In the last-mentioned position, it is then possible to eject a briquette from the compressing cylinder by further advancing the compressing piston.

Briquetting presses are also known in which the end of the compressing cylinder is permanently open, but the clear diameter of said compressing cylinder decreases towards the end. In the case of compressing cylinders of this kind, it is possible to manufacture an endless briquette strand, under which circumstances granular material which is freshly fed into the compressing cylinder is first of all pre-compacted, in the course of each stroke of the compressing piston, through the fact that said material is pressed against the material which has already been compressed earlier and which is bearing against the wall of the compressing cylinder with frictional contact. When this pre-compacting operation is brought to an end, a piece of the briquette strand that corresponds to the quantity of material which has been added is pushed, as the compressing piston continues to advance, out of the unobstructed end of the compressing cylinder, where it then generally drops off the strand as a result of its own weight.

This kind of briquette manufacture is less advantageous for some materials, because the maximum pressure which is achieved during the briquetting operation is relatively low. Moreover, the individual briquettes obtained as a result of the breaking-off of the briquette strand do not have exactly the same axial dimensions, and the surfaces of the fracture, which form the end faces of the briquette, are irregularly shaped.

When use is made of the briquetting press according to the invention, on the other hand, all the briquettes have exactly the same external geometry. They can also be compressed using very high pressure, since the compressing ram operates against the rigidly supported cylinder bottom.

If desired, it is also possible, in the briquetting press according to the invention, to adjust the final compressing pressure in a simple manner via the drive which works on the compressing piston. As a rule, this consists of hydraulic working cylinders whose output force can be adjusted in a simple manner via the pressurisation of the working space of the working cylinder.

Advantageous further developments of the invention form the subject of additional embodiments.

The further development of the invention according to another embodiment is advantageous as regards enabling the cylinder bottom to absorb greater forces. The absorption of greater forces can take place more easily via a swivel bearing than via a sliding guide, which is also another possibility for displacing the cylinder bottom.

What is achieved by means of the further development of the invention according to another embodiment is that the compressing of the briquette does not lead to a swivelling movement of the cylinder bottom. The latter therefore does not need to be securely stabilised, in the direction of swivelling, by elaborate measures. Stabilisation by means of a positioning drive, which works on the cylinder bottom in any case, is sufficient.

The further development of the invention according to another embodiment is of advantage as regards simple swivelling of the cylinder bottom, using cost-effective and efficient working cylinders.

In a briquetting press according to another embodiment, the part that forms the cylinder bottom is very long, compared with the driving lever. The angle lever formed by the cylinder bottom and the driving part thus provides for gearing of the movement between the driving lever and the output-drive lever. It is thereby possible for the cylinder bottom to be swivelled between its two positions by small driving movements.

What is achieved by means of the further development of the invention according to another embodiment is that the cylinder bottom can be moved between its two positions using little force.

The further development according to another embodiment is of advantage as regards a compact construction of the press.

The further development of the invention according to another embodiment has the advantage that the movement of the cylinder bottom takes place in a horizontal plane, a fact which is of advantage as regards accommodating the compressing unit below the bottom of a storage bin.

In a press according to another embodiment, the finished briquettes are delivered in a predetermined orientation. This is advantageous when it is desired to stack the briquettes in a compact manner subsequent to manufacture.

The further development of the invention according to another embodiment is, again, of advantage as regards a compact overall arrangement consisting of the press and the associated storage bin for the product to be compressed.

The same applies to the further development of the invention according to another embodiment.

In a press according to another embodiment, the finished briquettes are moved towards the briquette delivery aperture at an increasing transverse distance from the axis of the compressing cylinder. This is advantageous because a rear section of a briquette, which section projects into a prolongation of the compressing cylinder, can be simultaneously used as an entraining means on which a subsequent briquette exerts an axial advancing force which is ultimately generated by the compressing piston.

The further development of the invention according to another embodiment is of advantage as regards simple and robust construction of the cylinder bottom and of the driving mechanism provided for the latter.

In a press according to another embodiment, the two guide plates for the cylinder bottom simultaneously serve as a robuist mounting for a bearing pin which carries said cylinder bottom.

The further development of the invention according to another embodiment makes it possible for the positioning cylinder which works on the movable cylinder bottom to be supported in a swivellable manner at a greater distance from the axis of the compressing cylinder. This is of advantage as regards having substantially the same geometry of application of the positioning force in the various swivelling positions of the cylinder bottom.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

The invention will be explained in greater detail below with the aid of exemplary embodiments and with reference to the drawings, in which.

DETAILED DESCRIPTION OF THE PRESENT INVENTION

Figure 1:
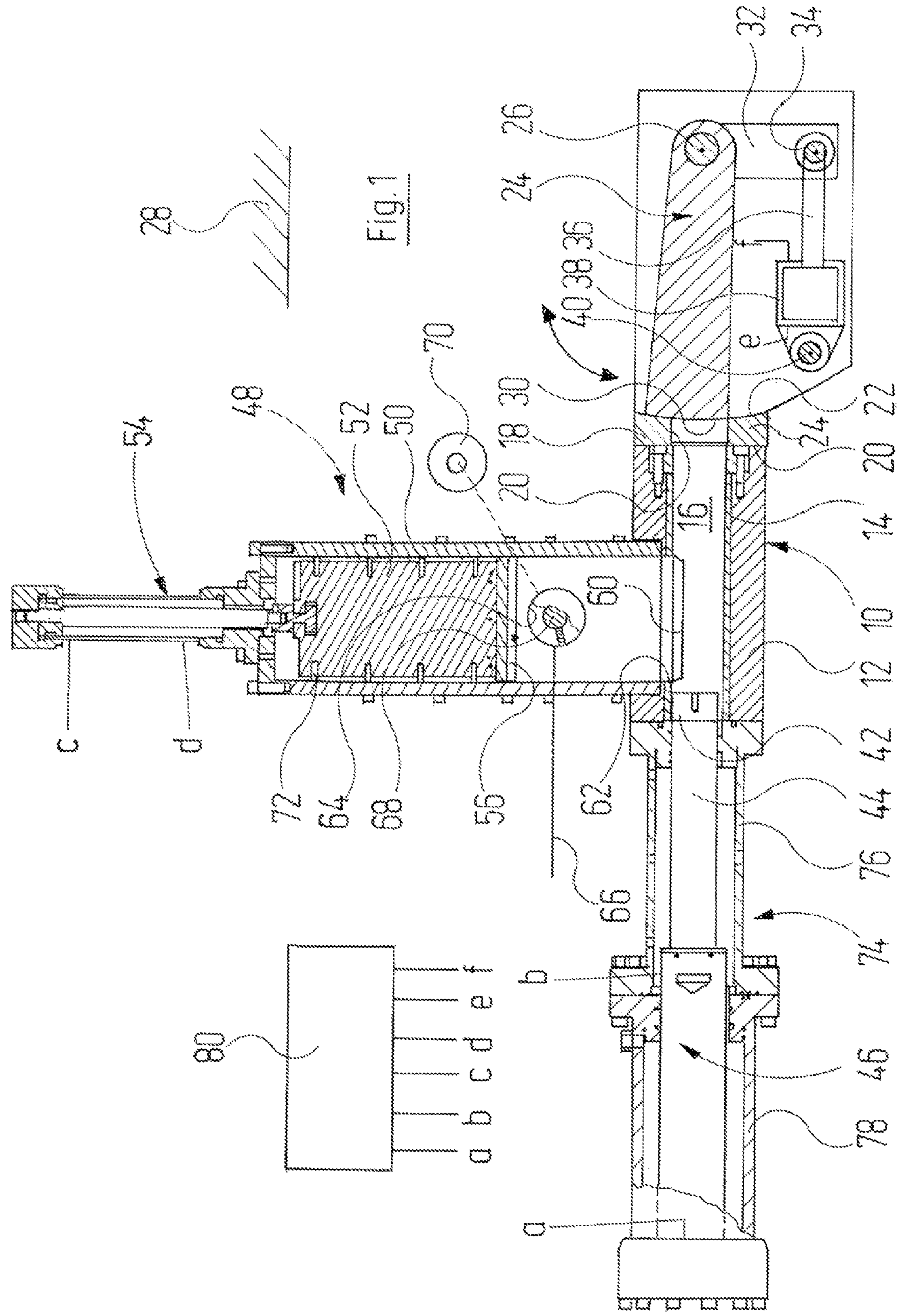
FIG. 1: shows a side view, which is partly cut away axially, of a press for briquetting granular material.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In the context of the present description and claims, “granular material” should be understood to mean any material which consists of fairly small individual pieces which can move in relation to one another and which, in bulk, are separated from one another by fairly large interstices. In concrete terms, this may be material which is obtained when sawing or milling a material such as wood, plastic or metal. However, it may also be a material in chip form, such as is obtained when planing wood or turning plastic or metal. Finally, it may also be small solid fragments which occur as residues in the course of sawing operations or are delivered by shredders.

In the drawings, a compressing cylinder is designated as a whole by 10. Said cylinder comprises a central cylinder section 12 which is lined with a hard, wear-resistant, smooth sleeve 14.

Said sleeve 14 delimits a compressing chamber 16.

Fixedly mounted on that end of the central cylinder section 12 which is located on the right in the drawing is a cylinder end-piece 18 which has a central aperture 20. The diameter of said aperture is slightly larger than the internal diameter of the sleeve 14.

The cylinder end-piece 18 has a flat end face on its side which is located on the left in the drawing. Its end face 22 which is on the right in the drawing has the shape of part of a cylinder.

Represented in the right-hand section of FIG. 1 is a cylinder bottom 24 which is arranged in a swivellable manner on a shaft 26. The latter is fixedly mounted, at its two ends, on a machine frame 28 which is only diagrammatically indicated in outline.

Just like the cylinder end-piece 18, the cylinder bottom 24 has a cross-section which remains the same in the direction perpendicular to the plane of the drawing. Its end face 30, which is located on the left in FIG. 1, has the shape of part of a cylinder, the axis of said cylinder coinciding with the axis of the shaft 26.

The end face 22 of the cylinder end-piece 18 is complementary to the end face 30 of the cylinder bottom 24; its axis likewise coincides with that of the shaft 26.

Connected to the cylinder bottom 24 in a torsion-proof manner is a driving lever 32. Its driving end, which is remote from the shaft 26, is connected in an articulated manner via a pin 34 to a piston rod 36 belonging to a hydraulic working cylinder 38. The housing of the latter is supported on the machine frame 28 in an articulated manner by means of a pin 40.

By pressurising the two working spaces of the working cylinder 38 in a suitable manner, the cylinder bottom 24 can be moved out of the working position represented in the drawing and into an unblocking position which is swivelled out of said working position in the clockwise direction and in which the aperture 20 is unobstructed.

Only small strokes of the working cylinder 38 are necessary for moving the cylinder bottom 24 between the unblocking position and the working position, since the angle lever formed by said cylinder bottom 24 and the driving lever 32 brings about gearing of the movement according to the ratios between the lengths of the cylinder bottom 24 and the driving lever 32.

A compressing piston 42 runs within the sleeve 14. Said piston is mounted on the end of a piston rod 44 which is part of a hydraulic working cylinder 46.

By acting on the working cylinder 46, it is possible to move the compressing piston 42 from left to right in the drawing in order to compress granular material. In the course of this movement, granular material fed into the compressing cylinder 10 is compressed against the cylinder bottom 24 which is located in its working position. In the process, the peripheral face of the material is given a shape which is predetermined by the sleeve 14. The end faces of the compressed material are given a geometry which corresponds to the geometry of the end face 30 of the cylinder bottom 24 and to the geometry of the front end face of the compressing piston 42, respectively.

A feeding unit, which is designated as a whole by 48, is provided for supplying granular material. Said unit comprises a feeding cylinder 50 whose axis is perpendicular to the axis of the compressing cylinder 10.

The feeding cylinder 50 is inserted, by its end that lies at the bottom in the drawing, in the wall of the cylinder section 12 in a form-locking manner.

A feeding piston 52, which is moved by a hydraulic working cylinder 54, is displaceable within the feeding cylinder 50. The feeding piston 52 has a front piston end-piece 56 which is at the bottom in the drawing and which has a cylindrical end face 58. When the feeding piston 52 is moved into a forward end location, said end face 58 constitutes a smooth extension of the peripheral wall of the sleeve 14 and fits exactly into an aperture 60, which is provided for supplying material, in the sleeve 14, and into an aperture 62, which is in alignment with said sleeve, in the peripheral wall of the central cylinder section 12.

For the purpose of supplying granular material, the peripheral wall of the feeding cylinder 50 is provided with an aperture 64 which is in communication with a feeding duct 66 within which a feeding worm 68, which is rotated by a motor 70, runs.

On its outer face, the feeding piston 52 carries various sealing rings 72 which are spaced apart axially.

The working cylinder 46 which works on the compressing piston 42 is arranged in a tubular protective housing 74 which consists of two bolted-together housing parts 76 and 78 and which constitutes a prolongation of the compressing cylinder 10 and is rigidly connected to the latter.

In the drawing, a pressure-supplying unit for the working cylinder 38 is represented diagrammatically at 80.

This works on a time basis in the following manner:

Starting from the rear end location, the working cylinder 38 is acted on by the full, predetermined feeding pressure. The movement of the compressing piston 42 is monitored at the same time, for example using a position-indicator which cooperates with the compressing piston 42 or the piston rod 44.

Alternatively, it is also possible to monitor the rise in pressure within the working space of the working cylinder 46.

From the point in time at which the sensor that cooperates with the compressing piston 42 or the piston rod 44 has indicated that the end position of the piston has been reached, the pressurisation of the working cylinder 46 is still maintained for a predetermined time span, in order to stabilise the compressing of the granular material within the press.

After this predetermined time span, the two working spaces of the working cylinder 46 are relieved of pressure and connected to one another. In this way, the compressing piston 42 no longer exerts any force on the briquette located within the compressing chamber 16. The abutting surface between the end face and the end face 30 of the cylinder bottom 24 is accordingly relieved of pressure, and the frictional contact between the end of the briquette and the end face of the cylinder bottom is correspondingly reduced. It is now possible to swivel the cylinder bottom 24 using little force.

This relieving of the pressure on the compressing piston 42 is maintained until the cylinder bottom 24 has reached its unblocking position. This may take place either using time-control or by monitoring the output signal of an end-location sensing device (not shown) which responds when said cylinder bottom 24 has reached its unblocking position.

The working cylinder 46 is then pressurised again in the extending direction by the pressure-supplying unit 76, so that the finished briquette is ejected from the compressing cylinder 10.

The pressure-supplying unit 76 then drives the working cylinder 46 into its retracted inoperative position again; this may again take place in a time-controlled manner or using an end-location sensing device.

The briquetting press described above works, overall, in the following manner:

In the starting state which is reproduced in the drawings, granular material is conveyed, by rotation of the feeding work 68, out of a storage bin and into the interior of the feeding cylinder 50, where it falls downwards.

When a predetermined quantity of material has been poured in, a fact which can be identified by a level-detector or even predetermined simply by the duration of operation of the feeding worm 68, said feeding worm 68 is stopped and the feeding piston 52 is moved forward, by suitable pressurisation of the working cylinder 54, to a point where the end face 58 of the piston end-piece 56 constitutes a smooth, aligned complement to the peripheral face of the sleeve 14. It is possible to guarantee that this end location has been reached, simply by means of suitable stops which cooperate with the piston end-piece 56 or the feeding piston 52.

The granular material which is located below the end face of the piston end-piece 56 is already slightly pre-compacted when the feeding piston 52 moves into the lower working position. Part of the granular material is also diverted in the lateral direction into the interior of the sleeve 14 under the pressure exerted by the feeding piston 52.

After the feeding piston 52 has reached its working position, the compressing piston 42 is moved from left to right in the drawing by suitable pressurisation of the working cylinder 46. This movement takes place until the front face of the compressing piston 42 has reached a distance in front of the end face 30 of the cylinder bottom 24 that corresponds to the desired axial dimension of a briquette. In view of the swelling-up again of the briquetted material after it leaves the briquetting press, this desired dimension may be slightly smaller than the size finally desired for the storage and transport of the briquettes.

After the compressing piston 42 has remained in its forward end position for a predetermined period, the pressurisation of the working cylinder 38 is temporarily suspended in order to reduce the friction between that end face of the finished briquette which is located on the right in the drawing, and the end face 30 of the cylinder bottom 24. Said cylinder bottom 24 is now swivelled in the clockwise direction by suitable pressurisation of the working cylinder 38, as a result of which the aperture 20 in the cylinder end-piece 18 is now unobstructed. The finished briquette is now ejected by the compressing piston 42 by pressurisation of the working cylinder 46 in the extending direction.

The compressing piston 42, the feeding piston 52 and the cylinder bottom 24 are then moved back again into their starting positions which are shown in the drawings, and the cycle described above for compressing a briquette runs its course anew.

The briquetting press described above is distinguished, in practical operation, by satisfactory stability in the dimensions of the briquettes produced. It is also possible to compress the granular material under very high pressure to form briquettes, since the open side of the compressing cylinder 12 can be closed by the cylinder bottom 24 in a reliable manner and with a high load-bearing capacity during the actual compressing operation.

The briquetting press is also of compact construction in most of the transverse directions. Only in that direction in which the feeding unit 48 is attached does it have larger dimensions.

Figure 2:
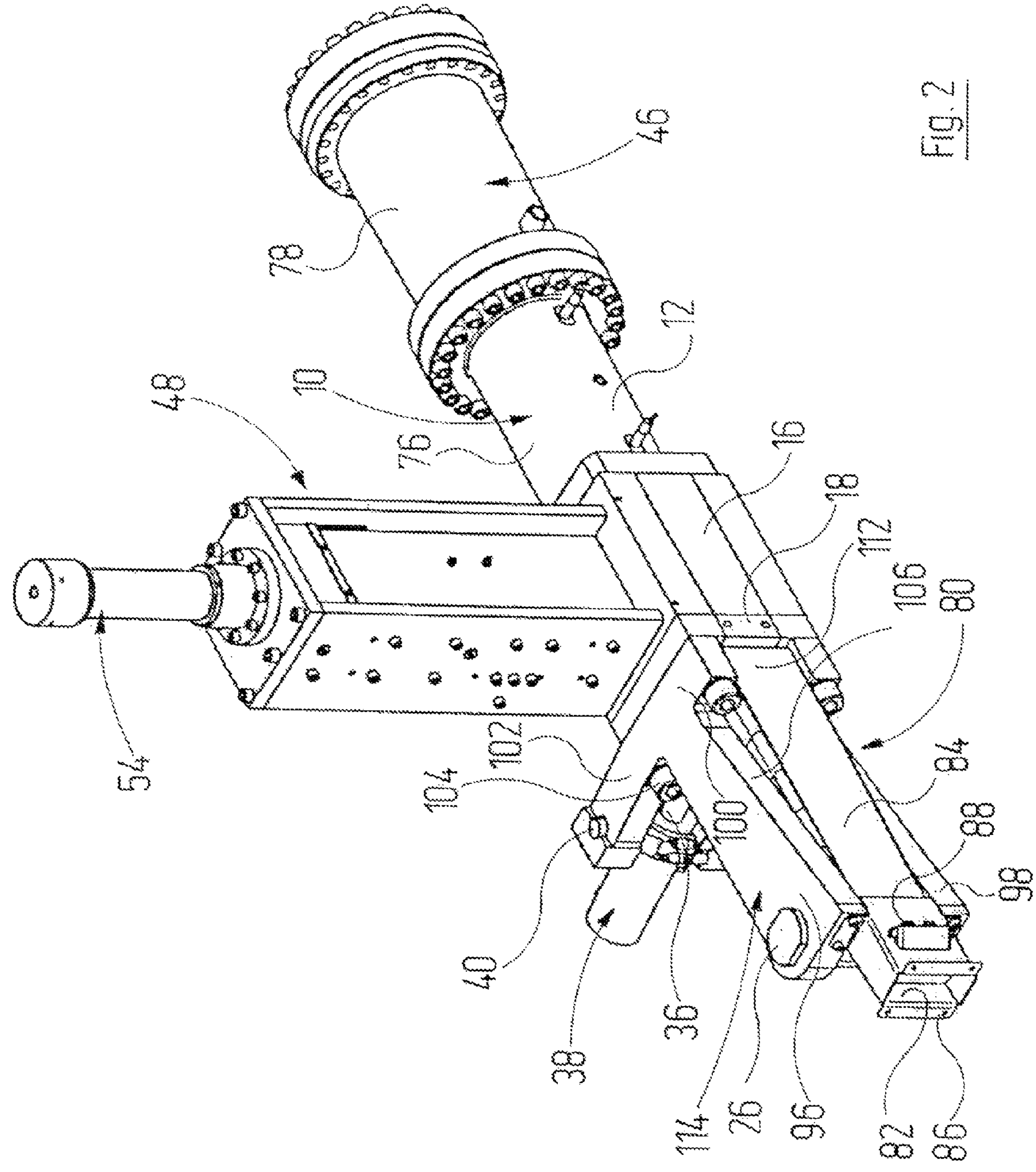
FIG. 2: shows a side view in perspective of a modified press which is provided, on the outlet side, with a delivery unit which makes the finished briquettes available in a predetermined orientation.

FIG. 2 shows a perspective view of the end of a press such as has been explained above with reference to FIG. 1. Components which correspond to components which have already been explained are again provided with the corresponding reference numerals and will not be described again in detail below.

The press shown in FIG. 2 has a delivery unit which is designated as a whole by 80 and which takes over, at an upstream end which is located on the right in FIG. 2, briquettes coming from the compressing cylinder 10, and conveys said briquettes, in a predetermined orientation, to a delivery aperture 82. At that point, they can be taken over by a handling apparatus which stacks the individual briquettes in a transport container.

The delivery unit 80 comprises a delivery duct 84 which may be formed by a bent sheet-metal part or may be located, as is represented, within a solid part.

At the output end, the delivery duct 84 has turned-over flanges 86 by means of which it can be connected to a conveyor tube having an identical cross-sectional contour, within which the individual briquettes can then be conveyed to a packing location under the action of gravity or pressurisation or a mechanical drive.

In the end section of the delivery duct 84, there are provided, on both sides, braking rollers 88 which cooperate with two opposite main faces of a briquette 90 so that a briquette is delivered only when it is subjected to an ejecting force from behind.

Figure 3:
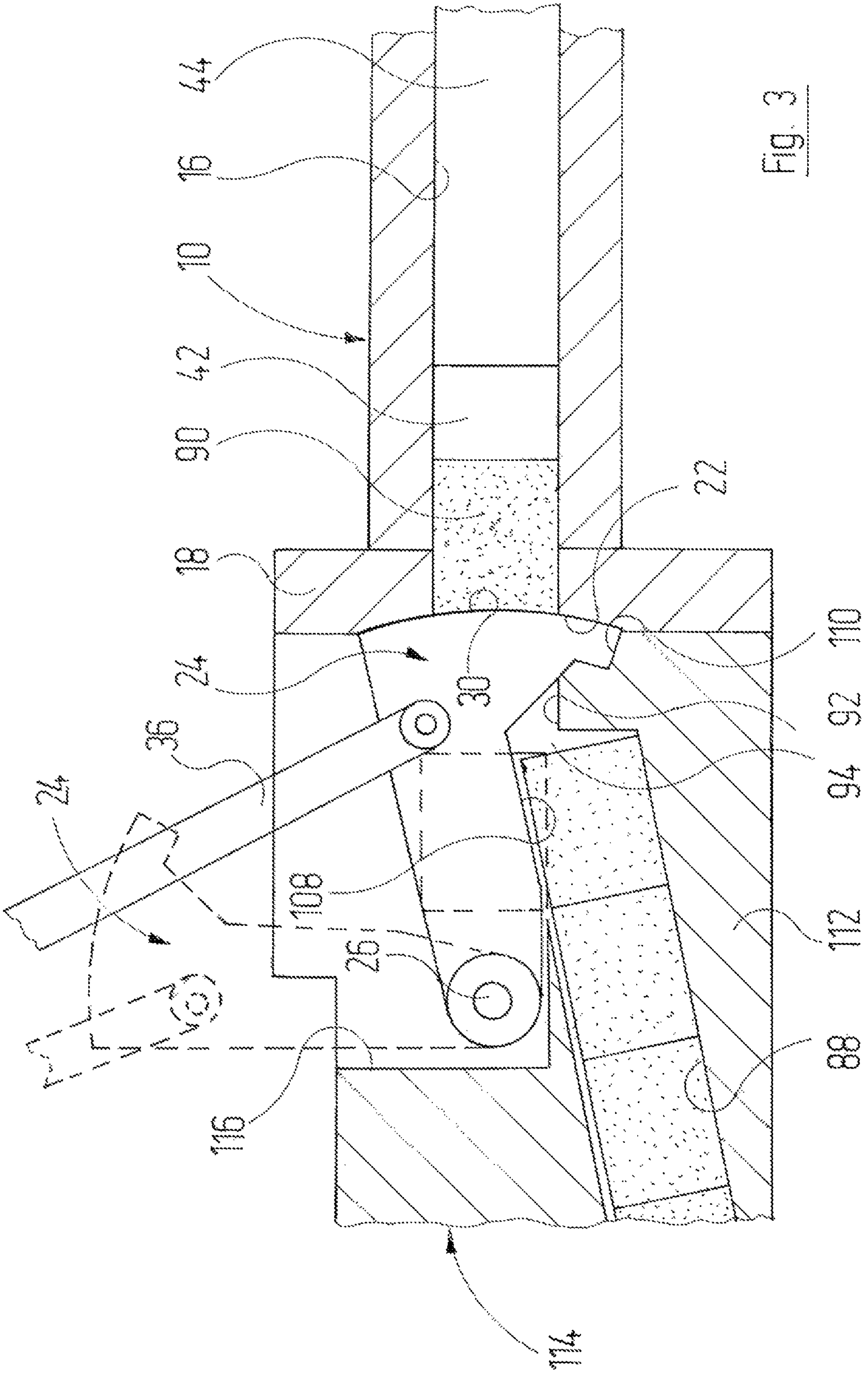
FIG. 3: shows a diagrammatic axial section through a briquette-disconnecting region which is located between the end of the compressing cylinder and a briquette delivery duct belonging to the delivery unit.

FIG. 3 shows a first possible way in which a finished briquette 90, which has been compacted between the front face of the compressing piston 16 and the cylinder bottom 24, is transferred into the delivery duct 84.

For this purpose, the cylinder bottom 24 is brought, by retraction of the piston rod 36, out of the working position represented in solid lines and into an inoperative position which, in the exemplary embodiment, is swivelled by 90° and which is reproduced in dashes in the drawing.

The compressing piston 16 is now able to push the finished briquette 90 into a transfer duct 92 which constitutes a prolongation of the compressing chamber 16 of the compressing cylinder 10.

In this connection, the stroke of the compressing piston 16 is dimensioned in such a way that, at the end of the stroke, the briquette 90 is moved into a transfer position which is represented in dashes and in which it is located above an aperture 94 which is obtained as a result of intersection of the delivery duct 84 with the transfer duct 92. The aperture 94 has at least the same axial dimensions as a briquette 90. The axial dimension of the aperture 94 is preferably about 10% larger than the length of a briquette 90.

As can be seen from FIG. 2, the bearing pin 26 for the cylinder bottom 24 is oriented vertically, so that said cylinder bottom 24 is moved within a horizontal plane. In the process, it is guided in laminar sliding contact between two guide plates 96, 98 which, for their part, are screwed to the end of the cylinder end-piece, or the end of the compressing cylinder 10, via screws 104.

As can be seen from FIG. 2, the guide plates 96, 98 each have, on the end that faces towards the compressing cylinder 10, transverse arms 100, 102 which are acted on by screws 104 which extend within the compressing cylinder 10 or the cylinder end-piece 18. At the same time, in order to keep the transverse dimensions of the press small, the arms 102 located on the right in FIG. 2 are so short that their end faces are continuous with the side face of the compressing cylinder 16. In order to nevertheless allow access to the fastening screws 104, that side 106 of the upper guide plate 96 and of the lower guide plate 98 which is located on the right in FIG. 2 is inclined in relation to the axis of the compressing cylinder 10, as FIG. 2 shows.

If one looks again at FIG. 3 and at the inoperative position, which is portrayed in dashes therein, of the cylinder bottom 24, it can be seen that, if the piston rod 36 is now extended again, that side of the cylinder bottom 24 which is on the right in FIG. 3 comes into contact with the upper side of the briquette 90 which has been moved into the transfer position. Said briquette is thus increasingly transferred into the delivery duct 92, until the cylinder bottom 24 reaches its working position which is reproduced in solid lines and in which a section 108 of its side that faces towards the delivery duct 92 forms a prolongation of that boundary wall of said delivery duct 84 which faces towards the central axis of the press.

In this position, that peripheral end face of the cylinder bottom 24 which is located at the bottom in FIG. 3 also impinges on a clearance 110 which is provided in a central plate 112 of the housing, which is designated as a whole by 114, of the delivery unit. This central plate 112 has a larger clearance 116 which allows unhindered movement of the cylinder bottom 24 between its working position and its inoperative position.

As can be seen from FIG. 3, a section of the last briquette 90, which section is close to the axis, still projects into the path of a briquette which is moved into the transfer position indicated in dashes after being completed by the compressing piston 16. In this way, the ejection of a briquette from the press simultaneously leads to a pushing-onwards, by one division, of the row of briquettes located in the delivery duct 84.

In the case of the delivery unit shown in FIG. 3, there is thus no need for a separate driving apparatus for moving the briquettes within the delivery duct 84.

When looking at FIG. 3 (and, later on below, FIG. 4), it should be borne in mind that the plane of the drawings is a horizontal plane and that the briquettes are guided within the compressing cylinder 10 on all sides and, within the tansfer duct 92, on two opposite end faces (the upper and lower ones) by the guide plates 96, 98. The force of gravity acting on them is absorbed by said guide plates 96, 98.

Figure 4:
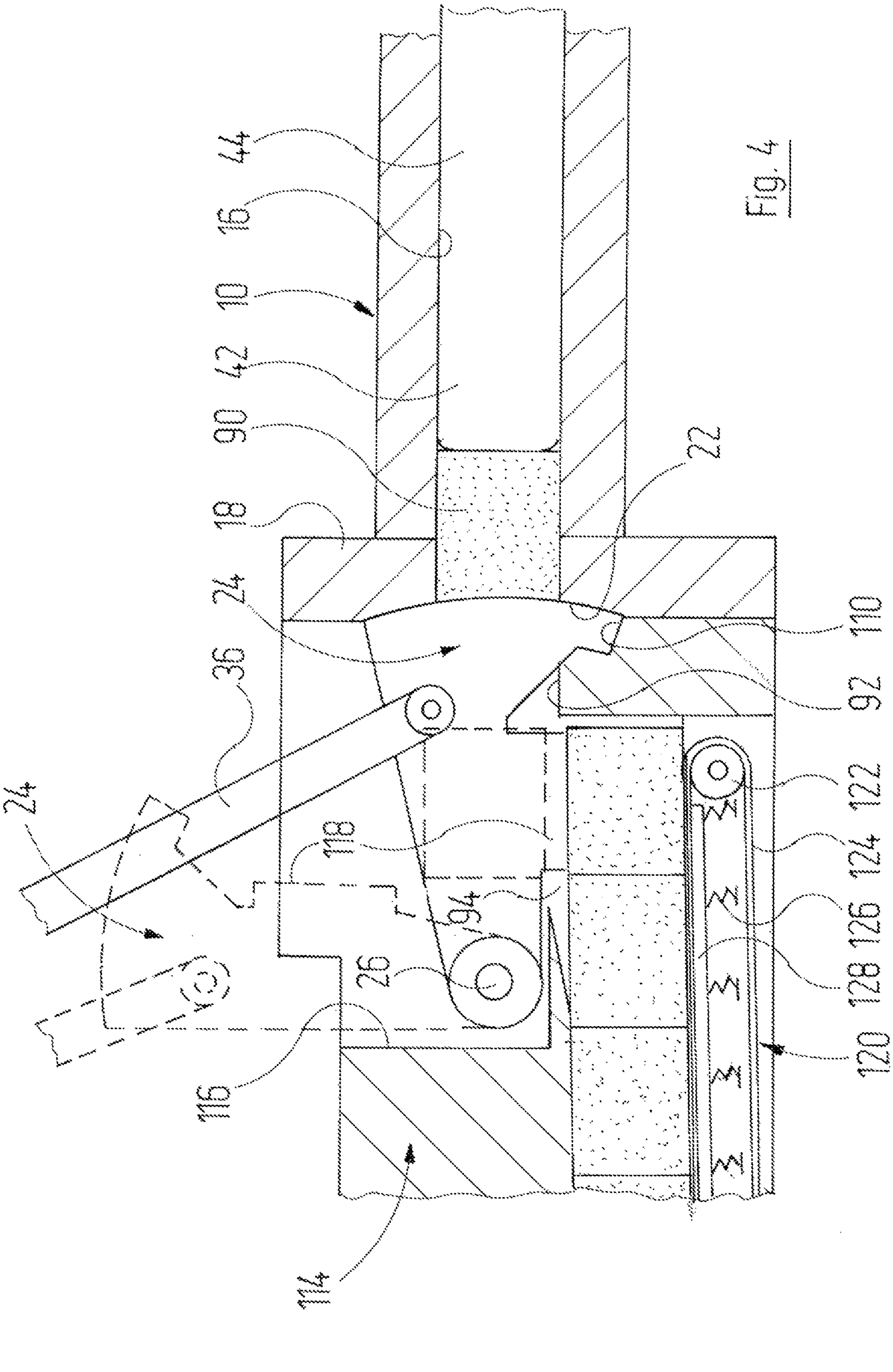
FIG. 4: shows a view which is similar to that in FIG. 3, but which shows a delivery unit having a delivery duct which is parallel to the axis of the compressing cylinder.

In the case of the delivery unit 80 shown in FIG. 4, parts which have already been explained above with reference to FIG. 3 are again provided with the same reference numerals and will not be described again in detail.

The delivery duct 84 now runs parallel to, and at a distance from, the duct in the compressing cylinder and the transfer duct 92. The cylinder bottom 24 is now provided with a rectangular extension 118 which moves a briquette in the lateral direction out of the transfer duct 92 and into the delivery duct 84.

Said delivery duct 84 now contains a belt conveyor which is designated as a whole by 120 and which is integrated into the externally located side wall of said delivery duct 84. This conveyor contains, in addition to deflecting rollers 122 of which only one is shown, a conveyor belt 124 which cooperates with the briquettes in a frictionally engaged manner, and a pressure plate 128 behind the rear side of the working strand of said conveyor belt 124, which pressure plate 128 is pretensioned in the direction of the briquettes by springs 126. As a result of the starting-up of the belt conveyor 120, the briquettes 90 are moved within the delivery duct 84 towards its delivery aperture 82.

The working of the belt conveyor 124 is, of course, synchronised electrically with the supplying of another briquette, in such a way that the section of the belt conveyor 124 that lies behind the transfer aperture 94 is empty before the ejection of a briquette.

The briquetting presses described above can be constructed from very simple and robust components.

Figure 5:
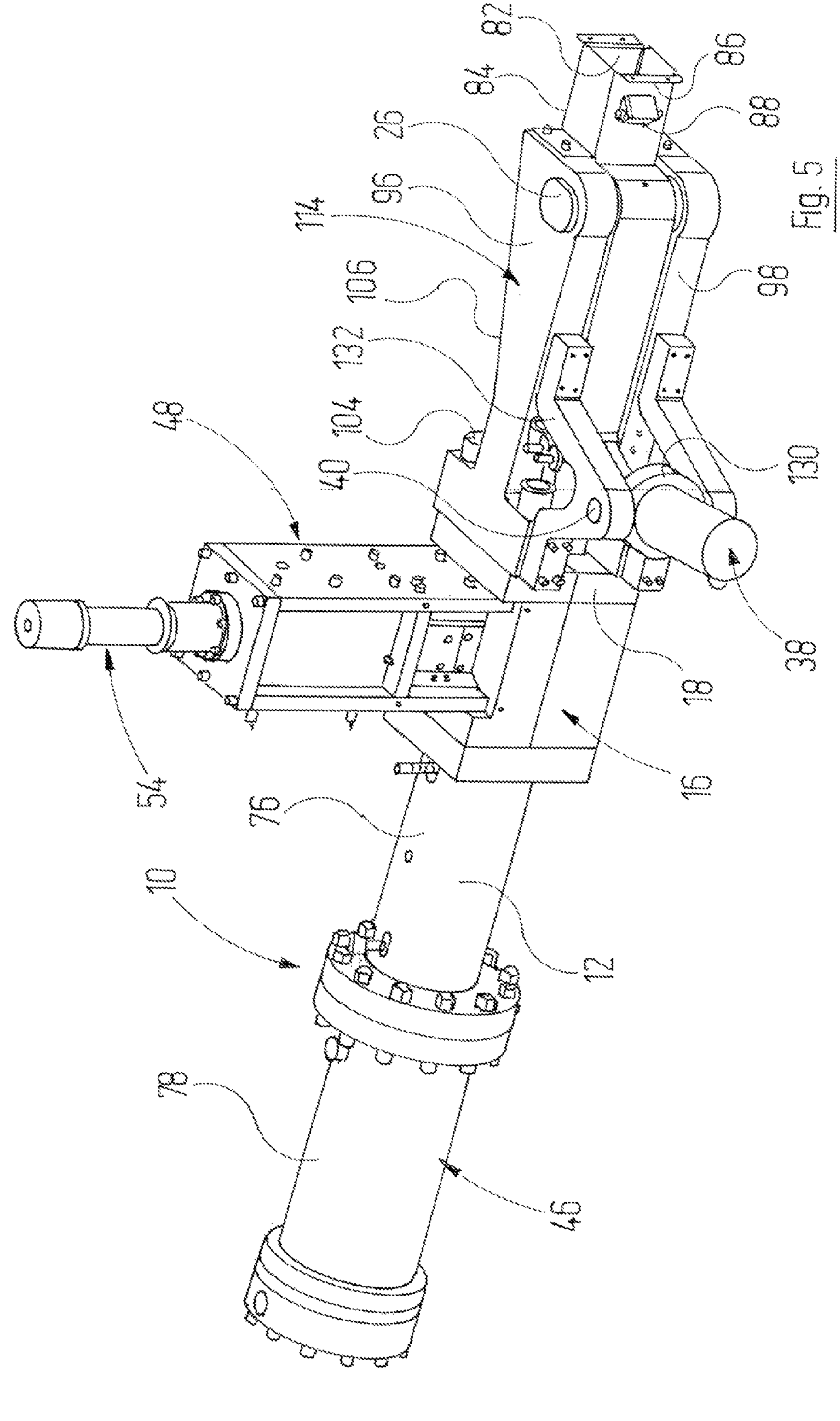
FIG. 5: shows a view in perspective of a modified press in which a working cylinder which works on a swivellable cylinder bottom is mounted in a swivellable manner on the housing of the delivery unit via bearing brackets.

In the modified press according to FIG. 5, the way in which the positioning cylinder 38 is supported is modified.

The outside of the cylinder housing carries a mounting ring 130 which is provided, on its upper side and underside, with a stub shaft 40 in each case.

The two stub shafts are rotatably mounted in bearing apertures in bearing brackets 132 which are screwed onto the side faces, which are the front side faces in FIG. 5, of the guide plates 96, 98.

In this way it is possible to fasten the positioning cylinder 36 on the housing 114 of the delivery unit 80 (guide plates 96, 98, plate 112) in such a way that there act on the cylinder bottom 24, both when the latter is in the working position and when it is in its inoperative position, forces which displace said cylinder bottom 24 safely between its positions, without the effective components of force of the positioning cylinder 36 varying in a heavily geometry-conditioned manner.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A press for briquetting granular material comprising:

a machine frame;

a compressing cylinder which has a separate cylinder bottom;

a compressing piston which is displaceable within said compressing cylinder;

a positioning apparatus by which a relative movement between the compressing cylinder and the cylinder bottom is produced; and, a compressing piston drive which works on the compressing piston, wherein the compressing cylinder is fixedly arranged on the machine frame and at least that an end of the cylinder bottom which is adjacent to the compressing cylinder is movable transversely to an axis of said compressing cylinder, and further wherein the cylinder bottom is arranged in a swivellable manner on the machine frame and an axis of swivelling of the cylinder bottom intersects the axis of the compressing cylinder.

2. The press according to claim 1, wherein the cylinder bottom and the compressing cylinder have mutually opposite, cooperating end faces which are of complementarily cylindrical construction, and axes of said cylindrical end faces coinciding with the axis of swiveling of the cylinder bottom.

3. The press according to claim 1, wherein the cylinder bottom is moved by a driving lever which is connected in a torsion-proof manner to the swivellably mounted end of said cylinder bottom.

4. The press according to claim 3, wherein the driving lever is connected to an output-drive part of a positioning cylinder and has a short working length compared to the cylinder bottom.

5. The press according to claim 1, further comprising:

a control system for the compressing piston drive which reduces or completely takes away a force exerted by the compressing piston while the cylinder bottom is being moved with respect to the compressing cylinder.

6. The press according to claim 1, wherein the axis of swivelling of the cylinder bottom extends parallel to an axis of a feeding unit.

7. The press according to claim 1, wherein the axis of swivelling of the cylinder bottom extends in a vertical direction.

8. The press according to claim 1, further comprising:

a delivery duct which, together with a transfer duct which constitutes a prolongation of the compressing chamber of the compressing cylinder, predetermines a transfer aperture, an axial dimension of which corresponds to at least an axial dimension of a briquette.

9. The press according to claim 8, wherein the delivery duct extends parallel to the axis of the compressing cylinder.

10. The press according to claim 9, wherein the delivery duct extends in the horizontal direction.

11. The press according to claim 8, wherein the delivery duct, or an upstream section thereof, forms an acute angle with the axis of the compressing cylinder.

12. The press according to claim 1, wherein the cylinder bottom is formed by an end face of a bottom plate which is arranged between two guide plates.

13. The press according to claim 12, wherein the bottom plate is swivellably mounted on the guide plates via a bearing pin.

14. The press according to claim 1, wherein a positioning cylinder for the cylinder bottom is supported on an extension of the machine frame, and which is connected thereby to the compressing cylinder.

15. The press according to one claim 6, wherein the cylinder bottom has, on a side which is adjacent to the axis of the compressing cylinder, a contour such that a briquette-is moved, in a manner aligned with side walls of the delivery duct, into an upstream end of said delivery duct when the cylinder bottom is moved out of an inoperative position and into a working position.

* * * * *